United States Patent [19]
Geiger

[11] 3,781,608
[45] Dec. 25, 1973

[54] FAST ACTING CIRCUITRY FOR DC OVERLOAD PROTECTION

[75] Inventor: Erich Geiger, Friesen, Germany
[73] Assignee: Loewe-Opta GmbH, Berlin, Germany
[22] Filed: Sept. 7, 1972
[21] Appl. No.: 287,092

[30] Foreign Application Priority Data
Sept. 8, 1971 Germany............... P 21 45 538.9

[52] U.S. Cl.................... 317/20, 317/22, 317/31, 323/9, 317/33 SC
[51] Int. Cl. ............................................. H02h 3/20
[58] Field of Search.................. 317/22, 20, 33 SC, 317/31; 323/9

[56] References Cited
UNITED STATES PATENTS
3,323,017   5/1967   Powell et al. .......................... 317/20
3,529,210   9/1970   Toshio Ito et al. ................... 317/20
3,558,983   1/1971   Steen ..................................... 317/20

*Primary Examiner*—James D. Trammell
*Attorney*—Arthur O. Klein

[57] ABSTRACT

An improved overload protection circuit is associated with a DC load having a first output whose voltage level exhibits a significant decrease in the presence of a short circuit in the load. A thyristor connected in series with a rectifier and a relatively large filter capacitor in the load power supply is normally maintained conductive by coupling its control electrode to the normally high voltage at the first output of the load, such high voltage being stored across a relatively small capacitor in the coupling circuit. When the load is shorted, the small capacitor discharges rapidly to decrease the voltage at the control electrode of the thyristor below its conductive threshhold, whereby the thyristor shuts off at the conclusion of the then-current input AC half cycle. A high-resistance bypass for the thyristor defines an auxiliary current path during thyristor shut-down so that upon correction of the short circuit, the filter capacitor (and therefore the small capacitor in the coupling circuit) recharges to turn on the thyristor and thereby restore operating load current.

8 Claims, 3 Drawing Figures 3,781,608

FAST ACTING CIRCUITRY FOR DC OVERLOAD PROTECTION

BACKGROUND OF THE INVENTION

Many types of DC loads are supplied with operating current from a power supply consisting of a rectifier and a filter capacitor serially connected across an AC source. One typical arrangement of the DC load, which is generally coupled to the filter capacitor, would be a conventional pulse-triggered horizontal oscillator for a television receiver. In this case, the output of the filter capacitor may constitute the B+ voltage for the oscillator.

In many such applications a short circuit or similar malfunction in the load will cause permanent damage if immediate measures are not taken to quench the increased current. Where the power supply is arranged as an energizing source for the above-mentioned pulsed horizontal oscillator, such a short would be exhibited, for example, where the oscillator is continually maintained conductive due to the excitation by spurious pulses in addition to the normal synchro-nizing pulses.

Many types of protective circuits have been proposed for cutting of the load current when a short curcuit develops in the load. In particular, these circuits have the disadvantage that once they are operated to cut off current flow in the load, they must either be manually reset to restore the normal load current or, alternatively, they automatically reset themselves when the load current falls below a predetermined minimum irrespective of whether the defect that caused the short has been repaired or not.

Another disadvantage of existing protective devices is their relatively long inherent response time necessitated by the fact that thay ar current-sensitive. As such, they are arranged to directly convert current changes to heat or, where they are instrumented electronically, they are coupled to the load through high-time-constant coupling circuitry. It is characteristic of such arrangements that by the time they are triggered to reduce any abnormally high load current, such current has been flowing through the load for a significant interval and may already have caused irreparable damage.

SUMMARY OF THE INVENTION

The improved protective circuit of the invention is adapted for operation with a load having a first output whose voltage is higher when the load is operating normally than when it is shorted. The protective circuit is designed to operate immediately after a defect occurs in the load to reduce the load current to a safe value and to automatically restore the load current to its normal value immediately after the defect in the load circuit has ben corrected.

In general, the invention contemplates a normally nonconductive, threshhold-conditioned gate (illustratively a thyristor) that is serially connected with the rectifier and the filter capacitor in the power supply. The thyristor is shunted by a bypass path whose resistance is significantly higher than that of the thyristor when the latter conducts.

A coupling circuit, which illustratively includes a capacitor smaller than the filter capacitor, is responsive to the voltage at the first output of the load for applying, to the control electrode of the thyristor, a voltage of sufficient amplitude to exceed the conductive threshhold of the thyristor only when the load is operating in its normal condition.

If the load becomes shorted, the filter capacitor and the relatively small capacitor in the coupling circuit are discharged to drop the level of the excitation voltage applied to the thyristor by the coupling circuit below the conductive threshhold of the thyristor, whereby the latter will cut off at the end of the then-current input AC half cycle. While the thyristor is thus disabled, the bypass circuit permits a finite but safe auxiliary current level to flow through the shorted load.

The filter capacitor cannot charge while the level remains shorted. However, as soon as the load short is repaired, the auxiliary bypass current is effective to recharge the filter capacitor, and the resultant activation of the load serves to recharge the smaller capacitor in the coupling curcuit via the first load output. This action increases the voltage at the control electrode of the thyristor above the threshhold again to cause the thyristor to conduct and thereby to restore full operating current to the load.

In an illustrative embodiment of the invention, the bypass path may include a normally disabled transistor or other controllable switch in series with a high resistance, with the collector of the transistor being connected to the control electrode of the thyristor. In this case the coupling circuit is arranged to enable the switch in the bypass path when the voltage at the first output of the load drops to a value indicative of a load malfunction. When this occurs, the shunting effect of the now-enabled switch on the control electode of the thyristor causes the voltage at such control electrode to fall below the conductive threshhold. The thyristor will accordingly be disabled at the conclusion of the then current input AC half cycle. When the short is removed, the coupling circuit disables the switch to remove the shunt and re-activate the thyristor.

BRIEF DESCRIPTION OF THE DRAWING

The invention is set forth more fully in the following detailed description taken in conjunction with the appended drawing, in which.

DETAILED DESCRIPTION

Figure 1:
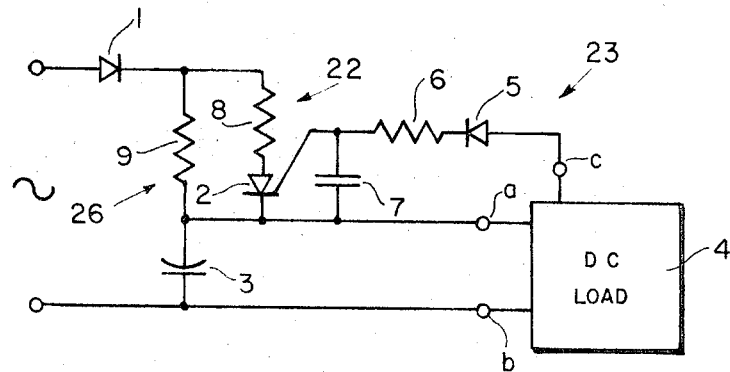
FIG. 1 is a block and schematic diagram of a first form of laod protection circuit in accordance with the invention.

Referring now in more detail to the drawing, FIG. 1 depicts a power supply for supplying rectified AC current to a DC load 4. The power supply includes a recitifer 1 which is serially connected through a first control path 22 and a filter capacitor 3 across an AC source. The load 4 has main input terminals a, b connected across the capacitor 3 so that in the presence of a short circuit in the load, a sharply reduced input impedance will effectively appear across the terminals a, b. Such reduced impedance effectively provides a low impedance discharge path for the capacitor 3.

In order to diminish to a safe value the load current supplied to the load 4 in the presence of such a short circuit, a coupling circuit designated generally as 23 extends from a terminal c of the load 4 to the control path 22 to effectively disable such path. When the short circuit in the load is corrected, the coupling network 23 reenables the path 22 as described below to immediately restore normal current through the load 4.

The coupling network 23, unlike many prior-art arrangements, is arranged to be voltage sensitive rather than current sensitive. Consequently, its operation is not susceptible to the significant time lags inherent in such current-sensitive circuits. Moreover, as will become apparent, the arrangement of the invention is designed to operate rapidly and automatically to restore normal load current. In this regard, unlike prior art thermostatic regulators employing openloop control, such restoration will occur only after the malfunction in the load is corrected.

In order to fully realize the advantage of the invention, it is contemplated that the terminal c of the load 4 exhibits a relatively high voltage level when the load is functioning normally and a significantly lower voltage level in the presence of a short circuit in the load.

Terminal c of the load 4 is connected through a diode 5 and a resistor 6 in the coupling network 23 to the control electrode of a controllable gate 2 (illustratively a thyristor) in the control path 22. The transconductive path of the thyristor is connected in series with the resistor 8.

The diode 5 is poled to apply DC voltage to such control electrode with the proper polarity to condition the thyristor for conduction when a predetermined threshhold voltage is exceeded. A capacitor 7, which is smaller than the filter capacitor 3, is connected in the coupling network 23 to effectively smooth out normal variations of the voltage at the terminal c.

A second auxiliary path 26 (illustratively formed by a resistor 9) is connected across the control path 22 and has a resistance that is significantly higher than that of the path 22 when the thyristor 2 is conductive. Therefore, when the thyristor 2 conducts, load current will be supplied to the load primarily through the control path 22. However, when the thyristor is disabled during load shorts as indicated below, a safely low auxiliary current will flow via the second path 26 through the negligible impedance now appearing between terminals a, b.

In the operation of the arrangement shown in FIG. 1, the normal functioning of the load extablishes a relatively high normal operating voltage across the capacitor 7 via the load terminal c. The perameters of the coupling network 23 are selected such that the voltage across the capacitor 7 under normal load operation is sufficiently high to maintain the voltage at the control electrode of the thyristor 2 above its conductive threshhold. As a result, during every rectified half cycle of the AC wave when the load is operaing normally, the thyristor 2 will conduct to provide current to the load 4 via the main power supply path 22.

When a short circuit occurs in the load, however, the filter capacitor 3 as well as the capacitor 7 in the coupling network 23 are individually shunted by low impedance discharge paths. The capacitor 7, being the smaller, will discharge more rapidly than the capacitor 3. This will reduce the voltage at the control electrode of the thyristor 2 below its threshhold, and the latter will be disabled at the conclusion of the then-current half cycle of the AC wave.

The only power supply current that will flow at this point will be the small residual current through the auxiliary path 26. During the time that the load 4 remains shorted, such residual current will be ineffective to charge the filter capacitor 3 because of the low impedance present between the terminals a, b. However, as soon as the short in the load is corrected and the normal input impedance across the terminals a and b restored, the residual current flowing through the path 26 will serve to recharge the capacitor 3. The resulting energizing of the load 4 will thereupon increase the voltage at the terminal c, and such increased voltage will be coupled through the diode 5 and the resistor 6 to recharge the capacitor 7. The latter in turn will raise the voltage at the control electrode of the thyristor 2 above its threshhold. The thyristor will thereupon conduct and the main path 22 will again be effective to drive normal current through the load 4.

Figure 2:
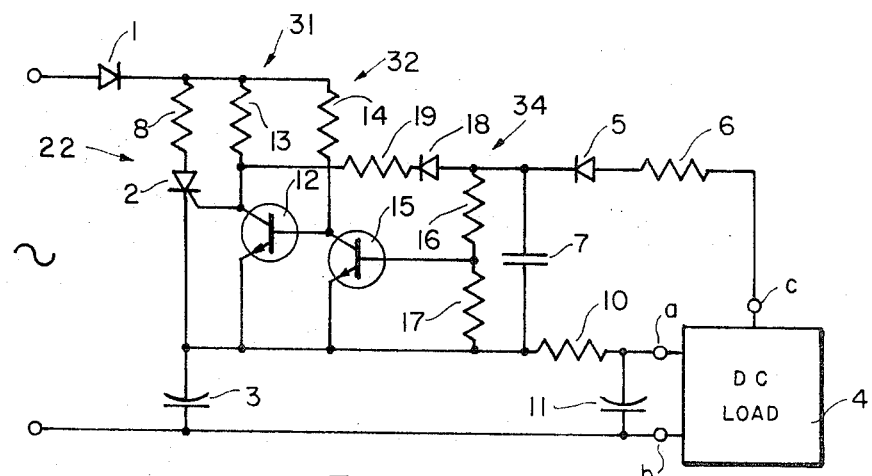
FIG. 2 is a block and schematic diagram of a second form of load protective circuit in accordance with the invention.

FIG. 2 depicts another embodiment of an overload protection circuit in accordance with the invention. In this case the main control path 22 as well as the diode 1, the capacitor 3, and the load 4, the diode 5, the resistor 6 and the capacitor 7 are connected as in FIG. 1 and operate accordingly. In addition, the low-pass filter in the power supply includes a resistor 10 and a capacitor 11 serially connected across the capacitor 3. The output of the capacitor 11 is connected across the input terminals a, b of the load 4.

The main control path 22 in FIG. 2 is bypassed by a transistor-controlled auxiliary path 31. The path 31 includes the collector-emitter path of a transistor 12 serially connected with a resistor 13 across the main control path 22. The resistance of the auxiliary path 31 when the transistor 12 is conductive is made significantly higher than the resistance of the first path 22 when the thyristor 2 is conductive. As indicated below, the transistor 12 is normally maintained in a nonconductive state when the DC load 4 is operating in a normal condition.

The collector-emitter path of a second transistor 15 is connected across the base-emitter path of the transistor 12. The transistor 15 is serially coupled with a resistor 14 to define an additional path 32 across the paths 22 and 31. The transistors 12 and 15 have their emitters commonly joined to the junction of the thyristor 2 and the capacitor 3.

When the load 4 is operating normally, the transistor 15 is maintained conductive by a voltage applied across its base-emitter path by the output of a voltage divider 34. Such divider consists of a pair of resistors 16 and 17. The voltage across the normally charged capacitor 7 is coupled across the divider 34. The voltage across the capacitor 7 is also coupled through a diode 18 and a resistor 19 to the collector of the transistor 12 and to the control electrode of the thyristor 2. As shown, the diode 18 serves to isolate the base of the transistor 15 from the collector of the transistor 12.

In the operation of the arrangement of FIG. 2, the relatively high voltage developed across the capacitor 7 during normal load operation will maintain the transistor 15 conductive via the voltage divider 34. This action normally shorts the base-emitter path of the transistor 12 so that the transistor 12 remains in a nonconductive state. The voltage developed across the capacitor 7 will be effectively applied to the control electrode of the thyristor 2 via the diode 18 and the resistor 19. Accordingly, normal operating current will be maintained through the load via the main control path 22 of the power supply.

Upon the occurrence of a short circuit in the load, the capacitor 7 will be discharged, as will the capacitors 3 and 11. Consequently, the voltage at the output of the voltage divider 34 will now be insufficient to maintain the conduction of the transistor 15; and upon the disabling of the transistor 15, the base-emitter voltage of the transistor 12 will be increased to turn such transistor on. The conduction of the transistor 12 will effectively shunt the control electrode of the thyristor 2 so that the thyristor will be disabled at the conclusion of the then-current AC half cycle.

After the thyristor 2 is disabled, a small residual current will continue to flow through the path 31 via the resistor 13 and the now conductive transistor 12. Such residual current will be ineffective to charge the capacitors 3 and 11 because of the low impedance across the terminals a, b of the shorted load 4.

As soon as the short is removed from the load 4, the impedance across the terminals a, b will increase. Thereupon, the auxiliary current flowing via the path 31 will charge capacitor 3 and 11 to reenable the load, so that the voltage at the terminal c can again rise to recharge the capacitor 7.

Since the junction of the resistor 13 and the transistor 12 in the path 31 is connected to the control electrode of the thyristor 2, the thyristor will be preconditioned for conductions when the load short is repaired, so that rapid switching transients through such thyristor will be avoided.

The increase in voltage at the output of the voltage divider 28 when the capacitor 7 recharges drives the transistor 15 back into conduction to disable the transistor 12. Accordingly, the shunting effect of the transistor 12 is removed from the control electrode of the thyristor, and the voltage at the capacitor 7 is again effectively applied to the control electrode via the diode 18 and the resistor 19. This drives the preconditioned thyristor back into conduction to restore normal load current through the rapaired load 4 via the main path 22 of the power supply.

Figure 3:
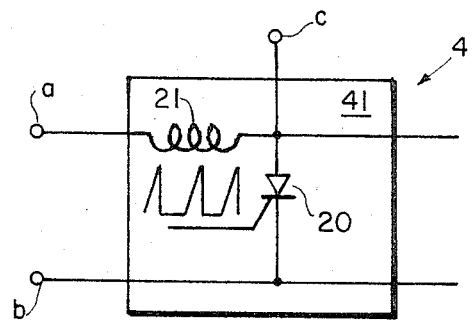
FIG. 3 is an illustrative embodiment of one form of load contemplated in FIGS. 1 and 2.

In a typical application, the load 4 may take the form of a triggered horizontal oscillator 41 (FIG. 3) of a television receiver not shown. The transconductive path of a control thyristor 20 in the oscillator is excited by periodic sync pulses from a suitable pulse source not shown. The transconductive path of the thyristor 20 is serially connected with an inductor 21 across the input terminals a, b. The output terminal c of the oscillator 41 is connected to the anode of the thyristor 20, and exhibits a decreased voltage upon an increase of the current through the oscillator. Such current increase may be caused, for example, by the applications of spurious pulses to the control electrode of the thyristor 20, along with the normal sync pulses. Such spurious pulses tend to maintain the oscillator in its "on" condition for an excessively long interval, so that the oscillator is effectively shorted. The restoration of normal pulse operating conditions in the oscillator will increase the potential at the terminal c to its normal value.

In the foregoing, the invention has been described in connection with preferred arrangements thereof. Many variations and modifications will now occur to those skilled in the art. It is accordingly desired that the scope of the appended claims not be limited to ths specific disclosure herein contained.

What is claimed is:

1. In combination with (i) a power supply including a low-pass filter serially connectable across an AC source and (ii) a load coupled to the filter for extracting DC current from the power supply, the load having a first output whose voltage level is higher when the load exhibits a first normal condition than when the load exhibits a second abnormal condition, an arrangement for reducing the load current when the load exhibits the second condition and for restoring the load current when the load again exhibits the first condition, which comprises:

a normally nonconductive gate having a transconductive path and a control electrode, the gate being conditioned for conduction upon the application to the control electrode of a voltage level above a predetermined threshhold;

a first path serially connected with the filter and including the transconductive path of the gate;

a second path connected across the first path and having a significantly higher DC resistance than the first path when the gate is conductive; and means responsive to the voltage level at the first output of the load for applying, to the control electrode of the gate, a voltage amplitude that exceeds the predetermined threshhold only when the load exhibits the first condition.

2. In combination with (i) a power supply including a low-pass filter serially connectable across an AC source and (ii) a load coupled to the filter for extracting current from the power supply, the load having a first output whose voltage level is higher when the load exhibits a first normal condition than when the load exhibits a second abnormal condition, an arrangement for reducing the load current when the load exhibits the second condition and for restoring the load current when the load again exhibits the first condition, which comprises:

a normally nonconductive gate having a transconductive path and a control electrode, the gate being conditioned for conduction upon the application of the control electrode of a voltage level above a predetermined threshold;

a first path serially connected with the filter and including the transconductive path of the gate;

a second path connected across the first path and having a significantly higher ressistance than the first path when the gate is conductive, the second path including a normally disabled controllable switch;

first means responsive to the voltage level at the first output of the load for applying, to the control electrode of the gate, a voltage amplitude that exceeds the predetermined threshold when the load exhibits the first condition;

second means responsive to the voltage at the first output of the load for enabling the switch when the load exhibits the second condition; and means for coupling the switch to the control electrode of the gate to effectively shunt said control electrode when the switch is enabled.

3. In combination with (i) a power supply including a low-pass filter serially connectable across an AC source and (ii) a load coupled to the filter for extracting current from the power supply, the load having a first output whose voltage level is higher when the load exhibits a first normal condition than when the load exhibits a second abnormal condition, an arrangement for reducing the load current when the load exhibits the second condition and for restoring the load current when the load again exhibits the first condition, which comprises:

a normally nonconductive thyristor having a transconductive path and a control electrode, the thyristor being conditioned for conduction upon the application to the control electrode of a voltage level above a predetermined threshhold;

a first path serially connected with the filter and including the transconductive path of the thyristor;

a second path connected across the first path and including a normally disabled switch, the second path having a significantly higher resistance than the first path when the thyristor is conductive;

means responsive to the voltage level at the first output of the load for applying, to the control electrode of the thyristor, a voltage amplitude that exceeds the predetermined threshhold of the thyristor when the load exhibits the first condition;

means for coupling the switch to the control electrode of the thyristor to effectively shunt said control electrode when the switch is enabled; and means responsive to the voltage level at the first output of the load for enabling the switch when the load exhibits its second condition.

4. An arrangement as defined in claim 3, in which the filter comprises a relatively large capacitor, and in which the applying means comprises a relatively small capacitor.

5. In combination with (i) a power supply including a low-pass filter serially connectable across an AC source and (ii) a load coupled to the filter for extracting current from the power supply, the load having a first output whose voltage level is higher when the load exhibits a first normal condition than when the load exhibits a second abnormal condition, an arrangement for reducing the load current when the load exhibits the second condition and for restoring the load current when the load again exhibits the first condition, which comprises:

a normally nonconductive gate having a transconductive path and a control electrode, the gate being conditioned for conduction upon the application to the control electrode of a voltage level above a predetermined threshhold;

a first path serially connected with the filter and including the transconductive path of the gate;

first and second transistors;

means for conductively connecting the emitters of the first and second transistors;

a second path connected across the first path and including the collector-emitter path of the first transistor, the second path having a significantly higher resistance than the first path when the gate is conductive;

a third path connected across the second path and including the collector-emitter path of the second transistor;

a voltage divider;

first means for coupling the input of the voltage divider to the first output of the load;

second means for coupling the input of the voltage divider to the collector of the first transistor and to the control electrode of the gate;

third means for coupling the output of the voltage divider to the base of the second transistor; and fourth means for coupling the collector of the second transistor to the base of the first transistor.

6. An arrangement as defined in claim 5, in which the gate is a thyristor.

7. An arrangement as defined in claim 5, in which the filter comprises a relatively large capacitor, and in which the first coupling means comprises a relatively small capacitor.

8. An arrangement as defined in claim 5, in which the second coupling means comprises means for isolating the base of the second transistor from the collector of the first transistor.

* * * * *